(12) United States Patent
Hamlin et al.

(10) Patent No.: US 11,435,447 B2
(45) Date of Patent: Sep. 6, 2022

(54) INFORMATION HANDLING SYSTEM PROXIMITY SENSOR WITH MECHANICALLY ADJUSTED FIELD OF VIEW

(71) Applicant: Dell Products L.P., Round Rock, TX (US)

(72) Inventors: Daniel L. Hamlin, Round Rock, TX (US); Vivek Viswanathan Iyer, Austin, TX (US); Timothy C. Shaw, Austin, TX (US); Allen B. McKittrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 546 days.

(21) Appl. No.: 16/599,220

(22) Filed: Oct. 11, 2019

(65) Prior Publication Data

US 2021/0109198 A1  Apr. 15, 2021

(51) Int. Cl.
*G01S 7/48* (2006.01)
*G01S 17/04* (2020.01)
*G01S 7/481* (2006.01)

(52) U.S. Cl.
CPC .......... *G01S 7/4816* (2013.01); *G01S 7/4808* (2013.01); *G01S 17/04* (2020.01)

(58) Field of Classification Search
CPC ...... G01S 7/4816; G01S 7/4808; G01S 17/04; G01S 17/10; G01S 17/42; G01S 7/4817
See application file for complete search history.

(56) References Cited

U.S. PATENT DOCUMENTS 7,714,265 B2   5/2010   Fadell et al.
8,363,098 B2   1/2013   Rosener et al.
(Continued)

FOREIGN PATENT DOCUMENTS

CA   2027515   7/2000
CA   2838280   12/2012
(Continued)

OTHER PUBLICATIONS

Pidgeon, Elana, "Windows 10 Tip: How to Enable Focus Assist in the Windows 10 April 2018 Update," downloaded from https://blogs.windows.com/windowsexperience/2018/05/09/windows-10-tip-how-to-enable-focus-assist-in-the-windows-10-april-2018-update/ Feb. 28, 2020, 7 pages.
(Continued)

*Primary Examiner* — Seung C Sohn
(74) *Attorney, Agent, or Firm* — Zagorin Cave LLP; Robert W. Holland (57) ABSTRACT

A portable information handling system integrates an infrared time of flight sensor to detect end user presence and absence. The portable information handling system has a portable housing with rotationally coupled housing portions so that the infrared time of flight sensor orientation relative to an end user changes its alignment axis based upon an expected end user position relative to the end user. An actuator interfaces with the infrared time of flight sensor to adjust its field of view based upon sensed housing position or configuration and adjusts end user presence/absence detection at actuation to change the orientation of the time of flight sensor, such as by resetting the sensor are re-aligning the scan field of view.

20 Claims, 7 Drawing Sheets

(56) References Cited

U.S. PATENT DOCUMENTS

| | | |
|---|---|---|
| 8,593,277 B2 | 11/2013 | Nath et al. |
| 8,760,631 B2 | 6/2014 | Ritter et al. |
| 9,378,342 B2 | 6/2016 | Robison et al. |
| 9,672,627 B1 | 6/2017 | Ramaswamy |
| 10,071,706 B2 * | 9/2018 | Ette ................... B60R 25/2054 |
| 10,514,256 B1 * | 12/2019 | Kamarshi ............... G01C 3/08 |
| 10,819,920 B1 | 10/2020 | Hamlin |
| 2007/0139392 A1 | 6/2007 | Kim |
| 2011/0310005 A1 | 12/2011 | Chen |
| 2013/0346084 A1 | 12/2013 | Archambault et al. |
| 2014/0085221 A1 | 3/2014 | Kim |
| 2014/0109210 A1 | 4/2014 | Borzycki et al. |
| 2014/0215248 A1 | 7/2014 | Cheng |
| 2015/0085060 A1 | 3/2015 | Fish |
| 2016/0127765 A1 | 5/2016 | Robinson |
| 2017/0205876 A1 | 7/2017 | Vidal |
| 2018/0275752 A1 | 9/2018 | Peterson |
| 2018/0321731 A1 | 11/2018 | Alfano et al. |
| 2019/0034609 A1 | 1/2019 | Yang |
| 2020/0142471 A1 | 5/2020 | Azam |
| 2020/0373810 A1 | 11/2020 | Channaiah |
| 2021/0132769 A1 | 5/2021 | Parikh et al. |

FOREIGN PATENT DOCUMENTS

| | | |
|---|---|---|
| CN | 103347437 | 10/2013 |
| EP | 2472424 | 7/2012 |
| WO | 2021047435 | 3/2021 |

OTHER PUBLICATIONS

Reddit, "Windows 10" Comments downloaded from https://www.reddit.com/r/Windows10/comments/9d7ohc/notifications_are_queued_up_and_displayed_in/ on Feb. 28, 2020, 2 pages.

U.S. Appl. No. 16/599,222, filed Oct. 11, 2019, entitled "Information Handling System Infrared Proximity Detection with Distance Reduction Detection" to Inventors Daniel L. Hamlin et al.

U.S. Appl. No. 16/419,779, filed May 22, 2019, entitled "Augmented Information Handling System User Presence Detection" to Inventors Daniel L. Hamlin et al.

U.S. Appl. No. 16/599,224, filed Oct. 11, 2019, entitled "Information Handling System Infrared Proximity Detection with Ambient Light Management" to Inventors Daniel L. Hamlin.

U.S. Appl. No. 16/599,226, filed Oct. 11, 2019, entitled "Information Handling System Infrared Proximity Detection with Frequency Domain Modulation" to Inventors Daniel L. Hamlin et al.

U.S. Appl. No. 16/778,787, filed Jan. 31, 2020, entitled "Information Handling System Notification Presentation Based Upon User Presence Detection" to Inventors Daniel L. Hamlin et al.

U.S. Appl. No. 16/778,798, filed Jan. 31, 2020, entitled "Information Handling System Peripheral Enhanced User Presence Detection" to Inventors Daniel L. Hamlin et al.

U.S. Appl. No. 16/778,805, filed Jan. 31, 2020, entitled "Information Handling System Adaptive User Presence Detection" to Inventors Daniel L. Hamlin et al.

* cited by examiner

INFORMATION HANDLING SYSTEM PROXIMITY SENSOR WITH MECHANICALLY ADJUSTED FIELD OF VIEW

BACKGROUND OF THE INVENTION

Field of the Invention

The present invention relates in general to the field of portable information handling system proximity detection, and more particularly to an information handling system proximity sensor with mechanically adjusted field of view.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with processing components disposed in a housing and present the information at a display. Desktop information handling systems typically present information as visual images at a peripheral display and accept end user inputs through peripheral input/output (I/O) devices, such as a keyboard and/or mouse. Portable information handling systems typically integrate a display and I/O devices into a portable housing along with a power source, such as a rechargeable battery. Generally, information handling systems include some sort of logic to power down a display if an end user is not viewing presented visual images. Powering down a display reduces power consumption, which increases battery life of portable systems, and increases security by enforcing password protection before again presenting visual images and permitting access to processing resources through I/O devices. Typical "screensaver" logic powers down a display and locks an information handling system after a preset timeout expires without an end user interaction. Generally, once a timeout expires an end user has to make an input at an I/O device to wake the system to input a password. Although this logic tends to save power and increase security, use of a hard timeout means that an end user has to balance the length of the timeout with the inconvenience of interruptions to system use. A typical screensaver timeout of fifteen minutes leaves a considerable window of non-use during which power is consumed and unauthorized access is available.

To provide improved power management and security, a variety of Human Presence Detection (HPD) sensors have been developed. One promising HPD sensor is an infrared time of flight (IRTOF) sensor. IRTOF sensors illuminate an area where an end user is expected, such as in front of a display that presents visual images, with an infrared light source and detects objects based upon time of flight of infrared reflections detected at the sensor. For instance, the IRTOF sensor scans the IR light source as a narrow beam across plural sectors to detect changes in distance to objects in each sector so that a detected object that moves over time indicates a human presence. IRTOF sensors provide a high degree of accuracy and sensitivity so that a very rapid response to user absence and presence is provided. Thus, as long as the IRTOF sensor detects an end user in the field of view, the system will not timeout so that the end user's viewing is not interrupted. If the IRTOF sensor fails to detect an end user in the field of view, a very rapid timeout may be enforced since the IRTOF sensor tends to have an accurate and rapid user absence detection. An aggressive timing configuration that quickly turns off a display and locks a system at user absence detection tends to decrease power consumption and increase system security.

One difficulty with IRTOF sensors is that rapid and highly sensitive detection of presence and absence risks the application of false user absence detections that result in end user interruptions of system use. Although IRTOF sensors are highly sensitive and accurate, variations in operating conditions can result in false user absent indications. For example, typical IRTOF sensors scan a relatively narrow area in front of an information handling system display to detect end user presence since scanning a larger area increases the risk that a detected object other than an intended end user may keep the system in a user presence state even though the end user is absent. Yet, in some instances, an end user may operate at the edge of the IRTOF sensor scan so that inadvertent user absence indications are intermittently enforced. For instance, IRTOF sensors placed at an upper bezel of a display may lose track of an end user if the display is rotated past 90 and towards 120 degrees of rotation relative to a support surface. As another example, an IRTOF sensor at a bottom of a bezel may lose track of an end user viewing the display from a resting position, such as while passively view an audiovisual presentation.

SUMMARY OF THE INVENTION

Therefore, a need has arisen for a system and method which adjusts an infrared time of flight sensor scan field of view based on portable housing configuration.

In accordance with the present invention, a system and method are provided which substantially reduce the disadvantages and problems associated with previous methods and systems of adjusting an infrared time of flight sensor scan field of view. An infrared time of flight sensor integrates in a portable information handling system housing to align along plural axes under the influence of an actuator so that presence detection is performed in an expected end user location as the portable information handling system housing configuration changes.

More specifically, a portable information handling system processes information with processing components disposed in a portable housing having first and second portions rotationally coupled by a hinge to rotate between closed and open positions. An infrared time of flight sensor monitors a presence/absence detection zone of plural regions along an axis extending from a housing portion to an area where an end user is expected. When the information handling system housing configuration changes so that the end user is expected along a different axis, an actuator coupled to the infrared time of flight sensor shifts the detection zone to monitor the different axis. In one embodiment, the infrared time of flight sensor shifts between a first axis perpendicular to the housing portion when the rotational orientation is less than a threshold, such as slightly greater than 90 degrees or less of rotation, and a second off-perpendicular axis directed in part towards the second housing portion when the rotational orientation is greater than the threshold. In another embodiment having a display surface over both housing portions, the infrared time of flight sensor is directed out the face of a housing portion when vertical relative to a support surface and out the side of the housing portion when horizontal relative to a support surface. Upon actuation to adjust the infrared time of flight sensor axis, a reset of the sensor or an adjustment to the scan regions is applied to ensure accurate presence/absence tracking remains supported at the adjusted axis.

The present invention provides a number of important technical advantages. One example of an important technical advantage is that an end user on the edge of an IRTOF sensor scan will maintain a user presence state by adjusting the IRTOF sensor based upon portable housing configuration to move the IRTOF sensor scan to an expected user presence area. For instance, if a lid housing portion over rotates past a perpendicular vertical orientation, an automated shift of IRTOF scan towards the main housing portion maintains the scan region in an expected end user position. Motion of the IRTOF sensor resets user presence detection logic so that outdated user position information does not mistakenly trigger a change in presence/absence state once the scan region shifts. In one embodiment, actuation to shift the IRTOF sensor scan is performed at a user absence transition to validate that end user has departed from the system with the actuation performed in a direction of the end user's departure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An infrared time of flight sensor actuates between different axes based upon a portable information handling system housing configuration. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
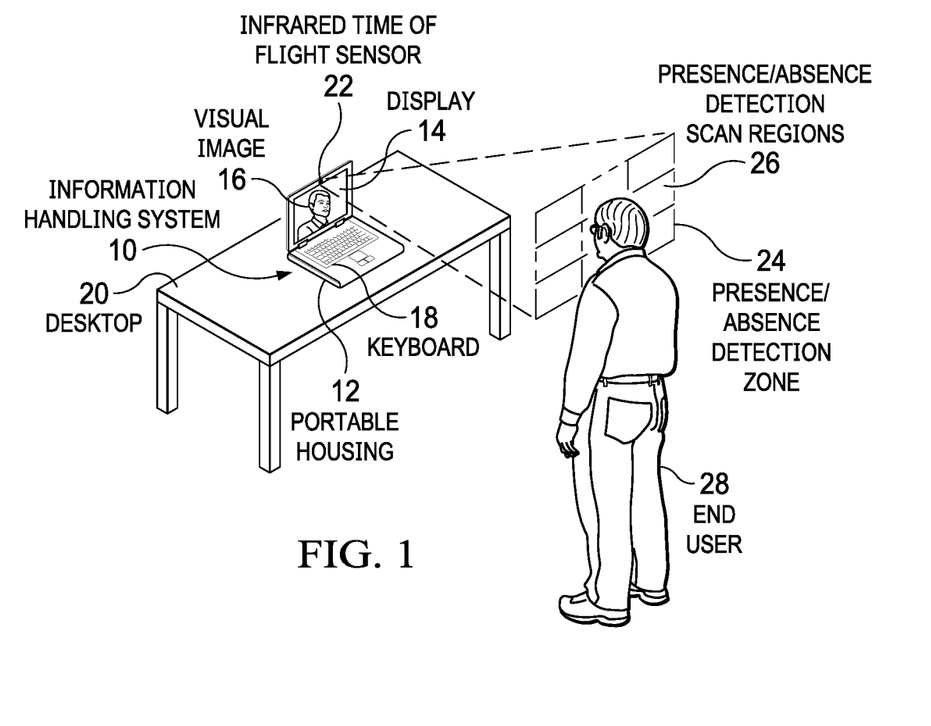
FIG. 1 depicts a portable information handling system monitoring an end user for presence and absence with an infrared time of flight (IRTOF) sensor.

Referring now to FIG. 1, a portable information handling system 10 monitors an end user 28 for presence and absence with an infrared time of flight (IRTOF) sensor 22. Information handling system 10 processes information with processing components disposed in a portable housing 12. In the example embodiment, portable housing 12 has rotationally coupled portions that rotate to a clamshell mode having a display 14 integrated in one housing portion raised to a vertical viewing position to present a visual image 16 over top of a keyboard 18 integrated in a second portion that rests on a desktop 20. End user 28 typically is within a limited distance of portable information handling system 10 when using the system. For instance, to type inputs at keyboard 18, end user 28 is within arm reach; to view visual image 16, end user 28 may have a slightly greater distance, depending on the size of display 14. Although the example embodiment depicts a portable information handling system, alternative embodiments may interact with desktop systems, peripheral displays and televisions.

IRTOF sensor 22 sends pulses of infrared light across a presence/absence detection zone 24 and detects reflections of the infrared light to determine a distance to objects, such as end user 28, within the presence/absence detection zone 24. For instance, IRTOF sensor 22 scans across plural presence/absence detection scan regions 26 in a scan pattern that detects a distance to an object in each region. Over time, animate objects are differentiated from inanimate objects by motion detected with changing distances to the objects in each region. When scan results of IRTOF sensor 22 indicates that a detected object is an end user, a presence detection is provided to the processing components of information handling system 10 so that visual image 16 stays active. When IRTOF sensor 22 indicates that the detected object has left, a user absence indication is provided to the processing components of information handling system 10 so that visual image 16 is removed, such as by powering down display 14. In addition, a user absence indication may be applied by information handling system 10 to lock the system so that it remains secure while end user 28 is not present.

IRTOF sensor 22 provides rapid and accurate user presence and absence detection to reduce power consumption and improve system security, however, if an inaccurate user absence detection is applied as a basis to power down display 14 when an end user is in fact present, the end user's interactions become disrupted. In some instances, IRTOF sensor 22 tends to lose accuracy so that false absence indications applied at information handling system 10 can disrupt end user interactions. For example, interference caused by ambient or point infrared light sources can impact the range and accuracy of IRTOF sensor 22. Generally, IRTOF sensors 22 perform a calibration at power up that attempts to quantify environmental conditions and select an IR frequency from plural available frequencies that will operate most accurately in a sensed environment. In addition, IRTOF sensor 22 adjusts the sensitivity at which it senses infrared reflections based upon the calibration. However, any number of factors can impact such a calibration, such as ambient light conditions or even the color shirt worn by an end user, so that a calibration at start tends to loss effectiveness over time. To maintain accurate user presence and absence detection, information handling system 10 tracks external conditions and adjusts IRTOF sensor 22 infrared sensing so that more accurate and validated user presence and absence are reported.

Figure 2:
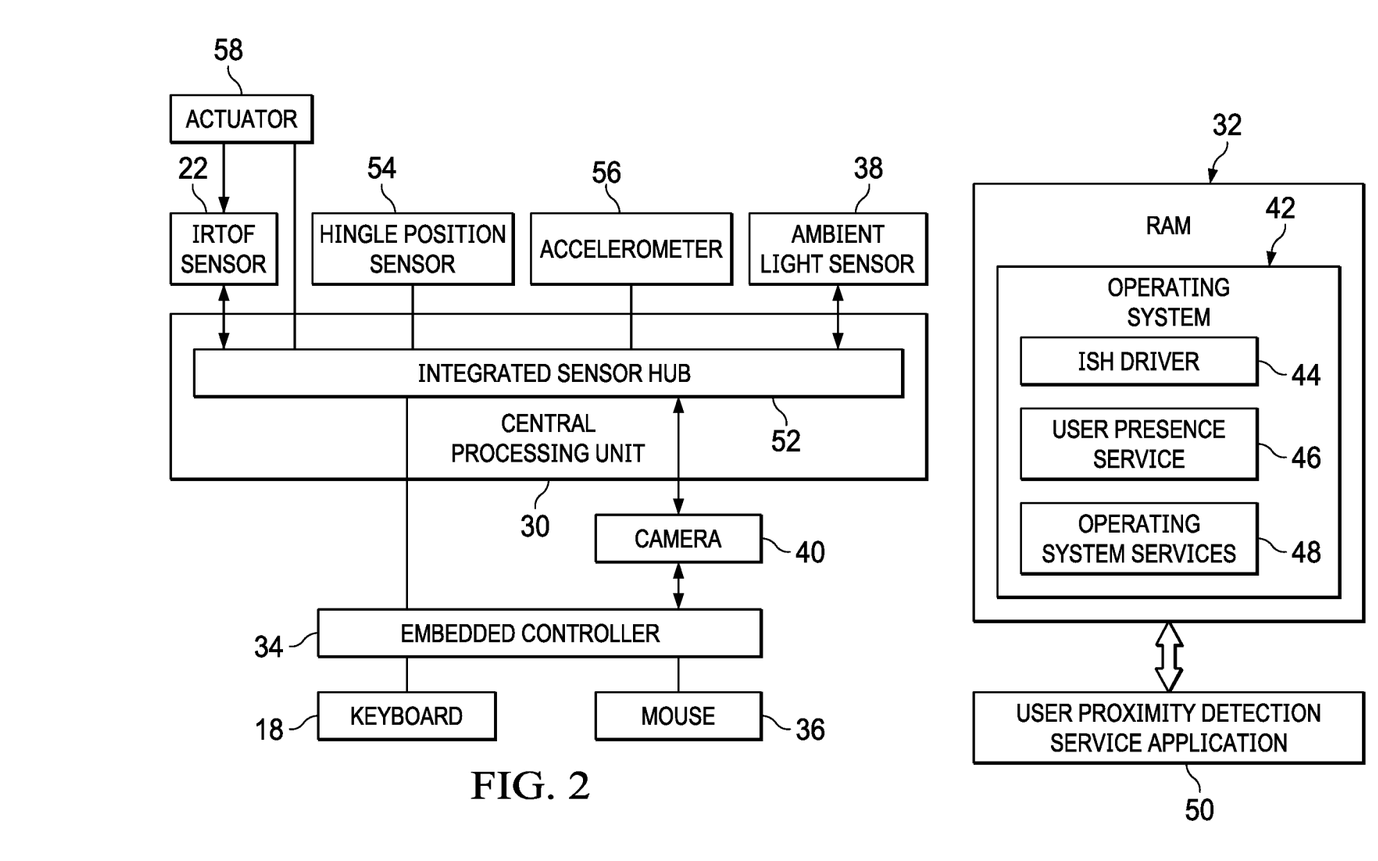
FIG. 2 depicts a block diagram of an information handling system having system level management of IRTOF sensor operations.

Referring now to FIG. 2, a block diagram depicts an information handling system 10 having system level management of IRTOF sensor 22 operations. In the example embodiment, a central processing unit (CPU) 30 executes instructions to process information stored in random access memory (RAM) 32. An embedded controller 34, such as a keyboard controller, manages system operations, such as by applying and removing power at CPU 30 and communicating inputs to CPU 30 from input/output (I/O) devices like keyboard 18 and mouse 36. Various types of peripheral devices and sensors may provide information to CPU 30, such as an ambient light sensor 38, which detects ambient light conditions that impacts display of visual images, and a camera 40, which captures images that may be used to support videoconferencing. In the various embodiments, sensor inputs to CPU 30 may be managed by embedded controller 34 or by sensor functionality integrated within CPU 30, such as the Integrated Sensor Hub (ISH) 52 provided in CPU architectures of INTEL. In the example embodiment, ISH 52 interfaces with and manages IRTOF sensor 22. In the example embodiment, a hinge position sensor 54 interfaces with ISH 52 and detects the rotational orientation of portable housing 12 by tracking the position of a hinge that rotationally couples housing portions to each other, such as a rotation from a closed position to the clamshell position illustrated in FIG. 1. Accelerometers 56 interface with ISH 52 and track accelerations at portable housing 12. For instance, accelerometers 56 may provide a gyroscopic feature that detects rotation of portable housing 12 and compares against gravity to determine an orientation of portable housing 12 relative to desktop 20.

End user presence or absence states reported from IRTOF sensor 22 to ISH 52 are managed at a system level by an operating system 42 executing on CPU 30 from RAM 32, such as WINDOWS. In the example embodiment, an ISH driver 44 interfaces with ISH 52 to manage ISH 52 interactions with a user presence service 46 providing the ISH driver 44 with an interface for IRTOF sensor 22. The sensed conditions are provided through operating system services 48 to a user proximity detection service application 50, which applies presence and absence indications of IRTOF sensor 22 to power down a display and lock a system. User proximity detection service application 50 is, for example, installed through operating system 48 to distribute the drivers through the operating system and firmware that manages IRTOF sensor 22. As is set forth in U.S. patent application Ser. No. 16/419,779 by Daniel L. Hamlin; Timothy C. Shaw; Vivek Viswanathan Iyer; Allen B. McKittrick, filed on May 22, 2019, entitled Augmented Information Handling System User Presence Detection, and incorporated herein as if fully set forth, a variety of other factors may also be considered when applying user presence and absence indications, such as inputs made by an end user and other conditions that indicate end user presence and absence.

In some instances, IRTOF sensor 22 may have its detection axis directed away from an expected end user position, which can result in false absence state detections. An actuator 58 interfaces with IRTOF sensor 22 to change the detection axis so that IRTOF sensor 22 remains directed at an expected end user position. For instance, presence detection logic in user proximity detection service application 50 or distributed to firmware elements through ISH driver 44 monitors the portable housing configuration to adjust the detection axis of IRTOF sensor 22 with actuator 58 as needed to maintain a user in the presence/absence detection zone 24. The configuration of portable housing 12 may be determined by relative rotational orientation of the housing as sensed by hinge position sensor 54 or accelerometer 56. Alternatively, accelerometer 56 may estimate an expected end user direction based upon accelerations relative to gravity. Actuator 58 adjusts the direction of IRTOF sensor 22 detection axis, such as with presence detection logic executing on ISH 52, so that false absence detection is less likely to result when portable housing configurations change the direction of an end user relative to information handling system 10. In addition, presence detection logic on ISH 52 at actuation of actuator 58 manages operation of IRTOF sensor 22 so that the change in direction of actuator 58 does not result in false negative and/or positive user presence states. For instance, in one example embodiment, after activation of actuator 58 a reset is applied to IRTOF sensor 22 so that a recalibration is performed for ambient light and infrared interference at the new scan direction. As another example, presence/absence detection scan regions 26 are realigned at the new directional axis so that presence absence detection continues where the scan regions overlap. In alternative embodiments, other adjustments may be applied at actuation of actuator 58, such as increasing the time for transitioning between user presence and absence states until IRTOF sensor 22 fully adapts to the new detection axis.

Figure 3A:
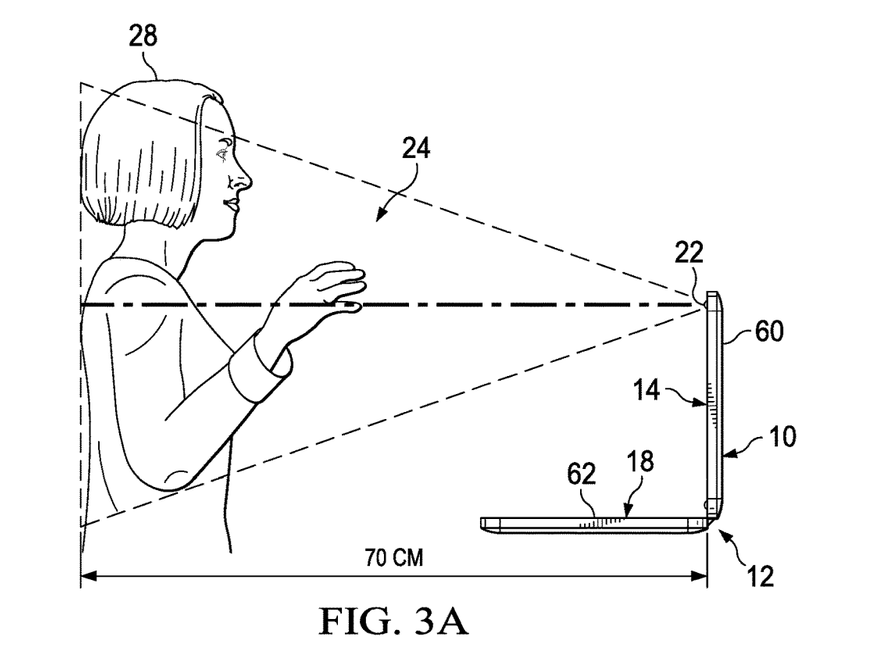
FIGS. 3A and 3B depicts a side view of a portable information handling system having a presence/absence detection zone directed perpendicular from a vertical housing portion.
Figure 3B:
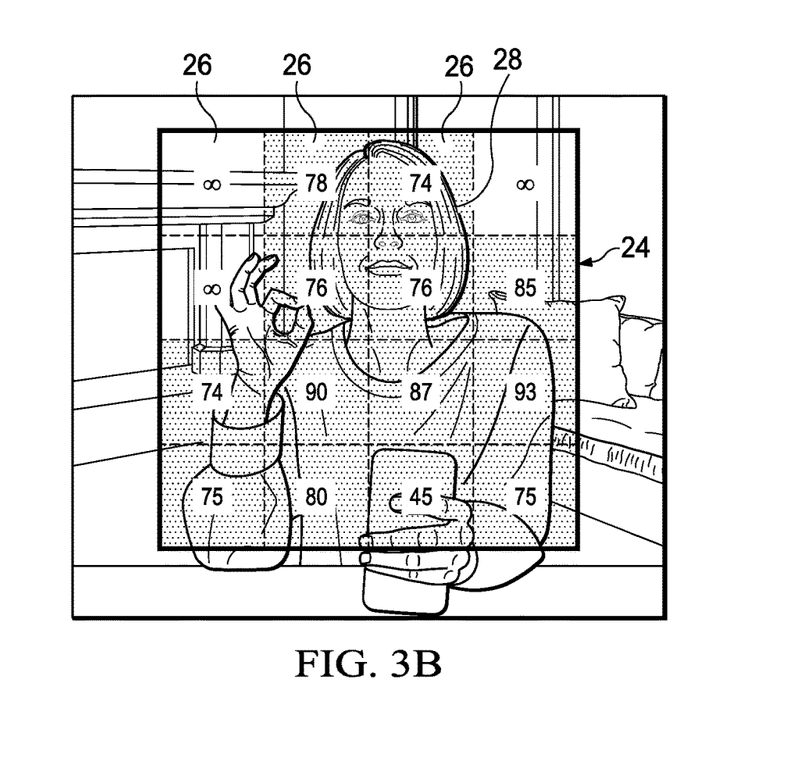

Referring now to FIGS. 3A and 3B, a side view depicts portable information handling system 10 having a presence/absence detection zone 24 directed perpendicular from a vertical lid housing portion 60. The example embodiment depicts a typical convertible information handling system 10 clamshell configuration, which accommodates end user typed inputs at keyboard 18 on a desktop support surface while viewing display 14. IRTOF sensor 22 is located at an upper bezel portion of lid housing portion 60, which is held vertically oriented by main housing portion 62. Presence/absence detection zone 24 centers on end user 28 in an expected position for the clamshell configuration. Presence/absence detection scan regions 26 provide good coverage of end user 28 in the expected position. Generally, with lid housing portion 60 substantially perpendicular to main housing portion 62, a perpendicular orientation from IRTOF sensor 22 of presence/absence detection zone 24 will capture an expected end user position. As housing 12 rotates past the vertical position and beyond 90 degrees of rotation, presence/absence detection zone 24 creeps over top of an expected end user position. For example at 110 to 120 degrees of rotation, half or more of scan regions 26 will be directed outside of an expected end user position.

Figure 4A:
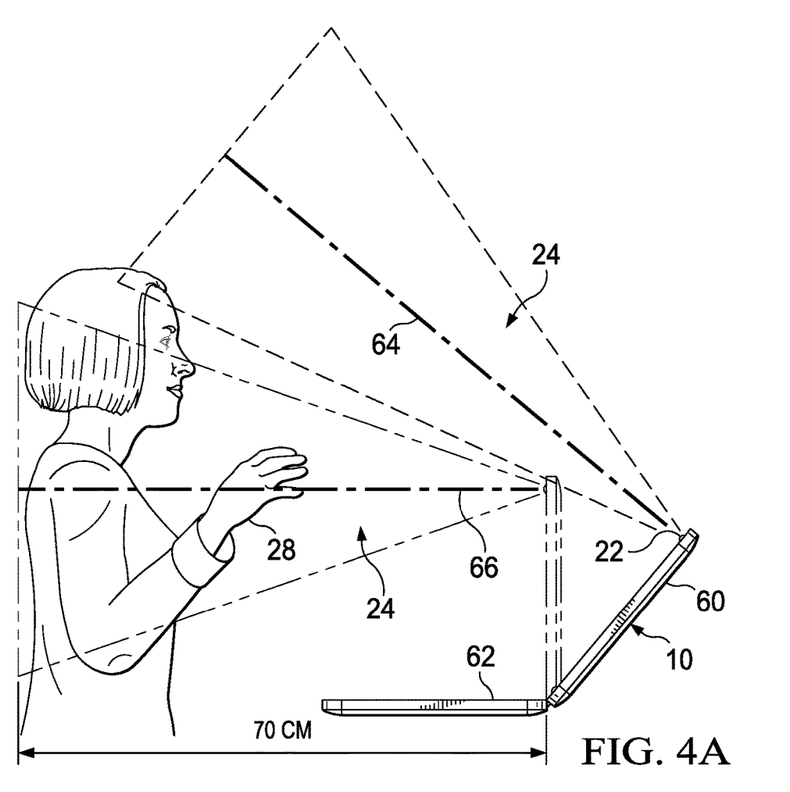
FIGS. 4A and 4B depicts a side view of the portable information handling system having the presence/absence zone rotated of an expected end user axis due to the portable housing rotational orientation configuration.
Figure 4B:
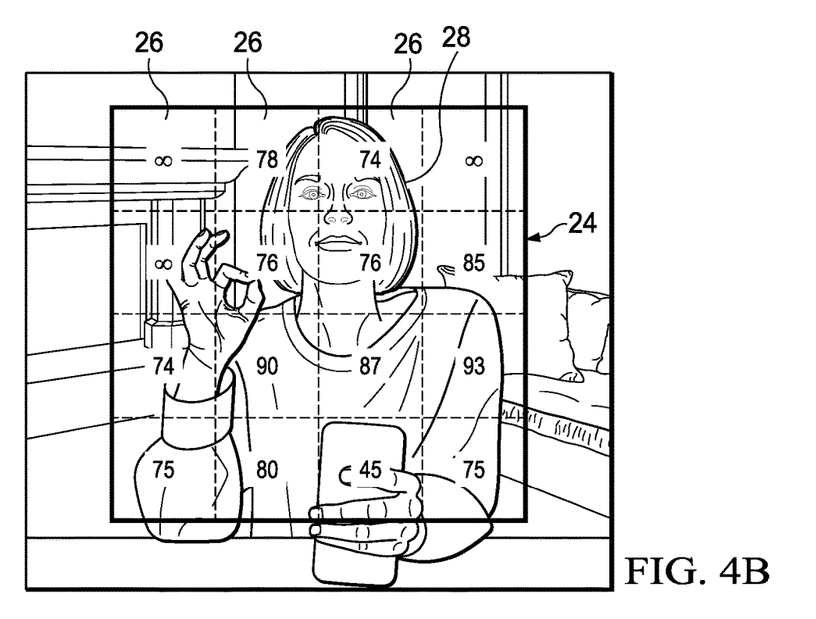

Referring now to FIGS. 4A and 4B, a side view depicts the portable information handling system 10 having the presence/absence detection zone 24 rotated past an expected end user axis due to the portable housing rotational orientation configuration. In the example embodiment, lid housing portion 60 and main housing portion 62 have rotated 130 degrees relative to a closed position so that IRTOF sensor 22 on its perpendicular axis 64 does not have end user 28 within the presence/absence detection zone 24. In order to place end user 28 within presence/absence detection scan regions 26, presence/absence detection zone 24 has to shift downward relative to perpendicular axis 64 towards an off-perpendicular axis 66 that, relative to perpendicular axis 24 has an offset towards main housing portion 62. In the example embodiment, actuation of IRTOF sensor 22 changes its detection axis to the off perpendicular axis 66 so that end user 28 falls within the detection zone. In addition, upon actuation to change the detection axis, IRTOF sensor 22 operations area adjusted for detection of end user 28, such as by increasing the expected distance to end user 28 or assigning sensed information from presence/absence detection scan regions 26 to new regions based upon alignment between the old and new regions before and after the actuation.

Figure 5A:
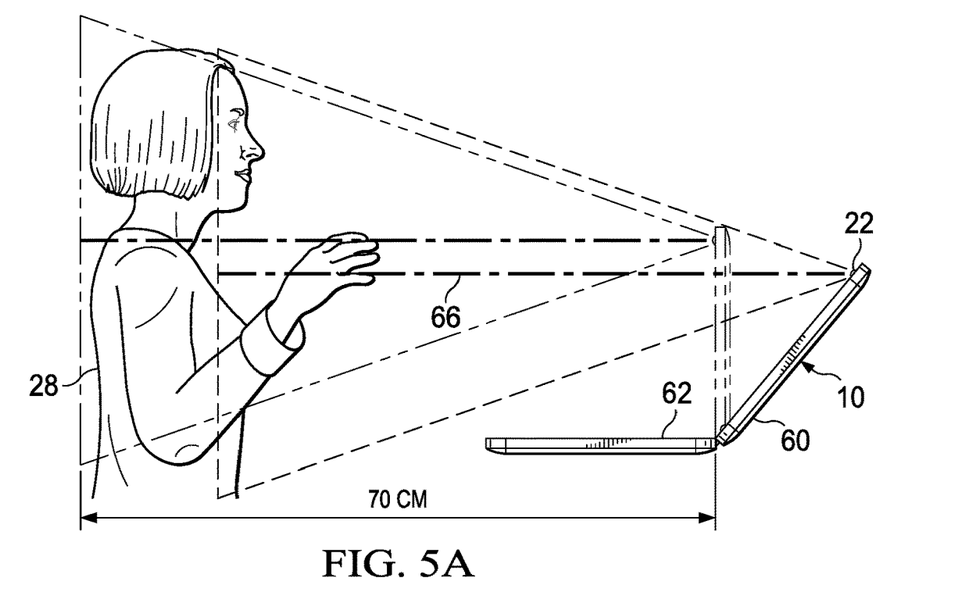
FIGS. 5A and 5B depicts a side view of the portable information handling system having the presence/absence zone actuated to the expected end user axis.
Figure 5B:
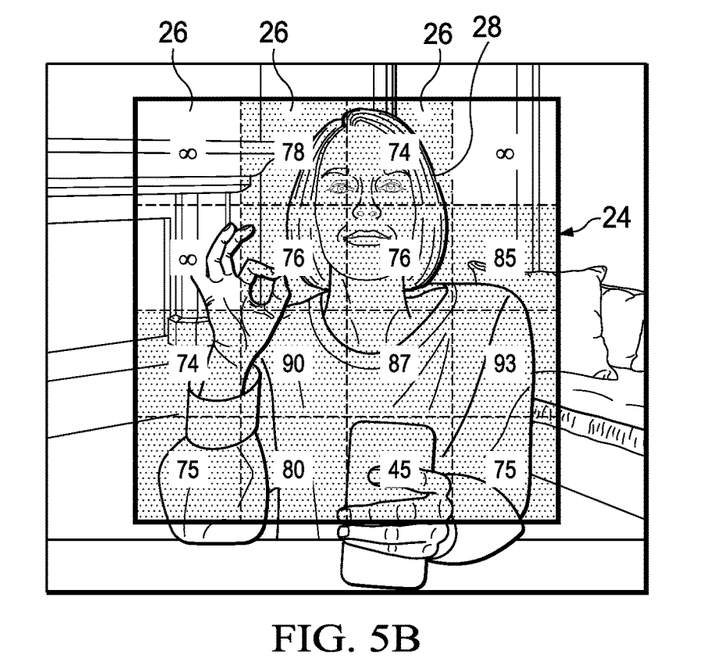

Referring now to FIGS. 5A and 5B, a side view depicts portable information handling system 10 having the presence/absence detection zone 24 actuated to the expected end user axis. In the depicted example configuration, actuation of IRTOF sensor 22 is performed at between 110 and 120 degrees of housing rotation. For instance, a hysteresis is provided by actuating to axis 66 at 120 degrees of rotation and back to perpendicular axis 64 at 110 degrees of rotation. The example embodiment is configured at 130 degrees of rotation so that off-perpendicular axis 66 is centered on end user 28. In the example embodiment, actuation of IRTOF sensor 22 is performed in an instantaneous manner at the detected threshold rotational orientations so that simultaneous with the actuation, IRTOF sensor 22 may be reset to adapt to the off-perpendicular axis 66, such as by commanding a reset or recalibration. In one embodiment, when presence/absence scan regions 26 align with other regions at the shifted axes, data for one region may be adjusted for consideration in different region that aligns with its previous field of view.

Figure 6:
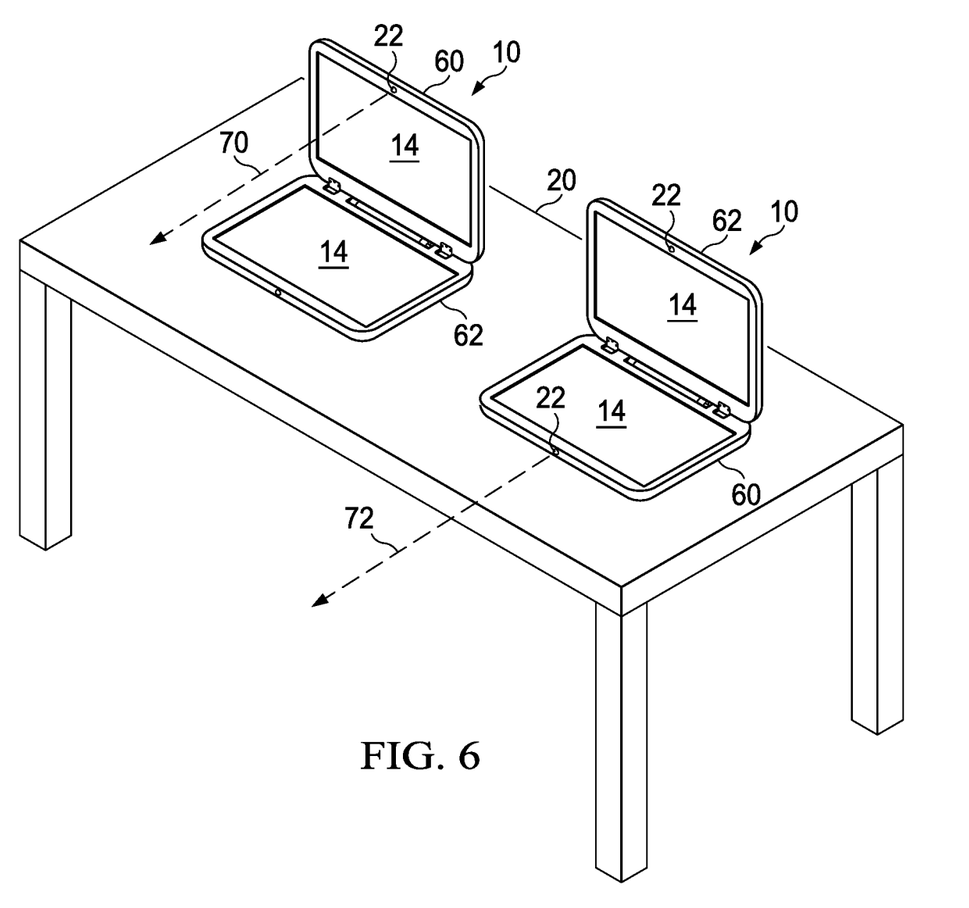
FIG. 6 depicts a dual display portable information handling system with first and second axes of orientation for the infrared time of flight sensor selected based upon which housing portion rests on a support surface.

Referring now to FIG. 6, a dual display 14 portable information handling system 10 is depicted with first and second axes 70 and 72 of orientation for the infrared time of flight sensor 22 selected based upon which housing portion 60 or 62 rests on a support surface 20. Each information handling system 10 has displays 14 disposed over both the housing portions 60 and 62 so that either housing portion may act as a base for resting on desktop 20 support. IRTOF sensor 22 has a first axis 70 that proceeds out perpendicular from housing portion 60 or, if the housing portions are rotated past a threshold, at an off-perpendicular axis as described above. When information handling system 10 is placed in an opposite configuration so that housing portion 60 rests on desktop 20, IRTOF sensor 22 actuates to axis 72, which proceeds out the upper surface of housing 60 parallel in plane with display 14. Actuation is, for example, managed in an instantaneous manner so that IRTOF sensor 22 is recalibrated for changed detection conditions at the vertical or horizontal orientation of its housing portion 60, such as by adjusting the distance expected to the end user target based upon the relative position of IRTOF sensor 22 and any differences related to ambient light at the lower versus the raised positions.

Figure 7:
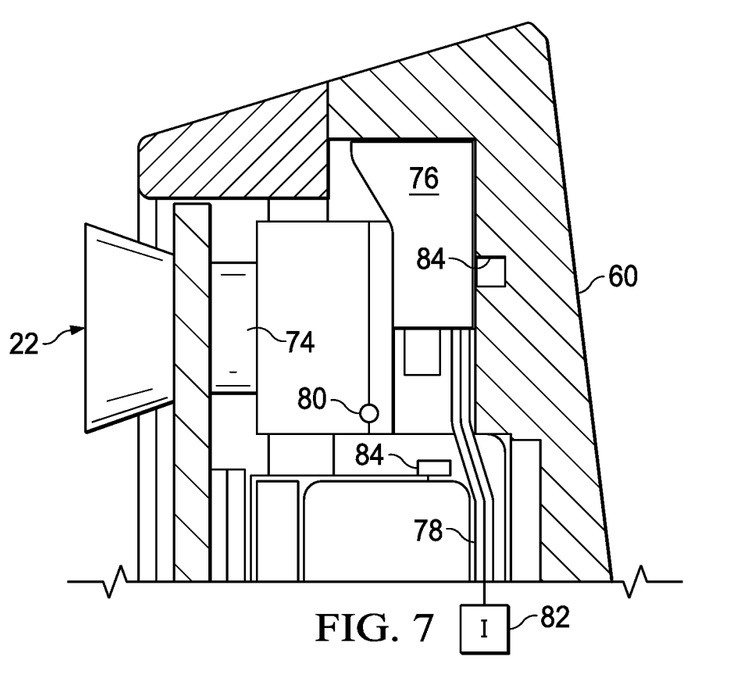
FIG. 7 depicts an example embodiment of an infrared time of flight sensor oriented along an axis perpendicular to a housing portion.

FIG. 7 depicts an example embodiment of an infrared time of flight sensor 22 oriented along an axis perpendicular to a housing portion 60. IRTOF sensor 22 is held in place by a shaft mount 80 against a compressible elastomer 74. A sliding substrate 76 holds shaft mount 80 in place so that IRTOF sensor 22 is directed outward with a detection axis perpendicular to housing portion 60, such as is depicted by FIGS. 3A and 3B. Sliding substrate 76 is held in position by a retainer 84, such as spring-loaded ball bearing or clip that inserts into sliding substrate 76. Sliding substrate 76 has an irregular support surface abutted against the backside of shaft mount 80 to hold shaft mount 80 in position against compressible elastomer 74. A nickel titanium wire 78, sometimes referred to as a muscle wire, couples at one end to sliding substrate 76 and an opposing end to a current source 82. Actuation to change the detection axis of IRTOF sensor 22 is performed by passing current from current source 82 through nickel titanium wire 78 to heat the wire, resulting in a change in crystal phase that shortens the wire and pulls sliding substrate 76 under shaft mount 80. In the example embodiment, the pull of wire 78 overcomes a bias of retainer 84 so that retainer 84 releases sliding substrate 76 to slide relative to shaft mount 80.

Figure 8:
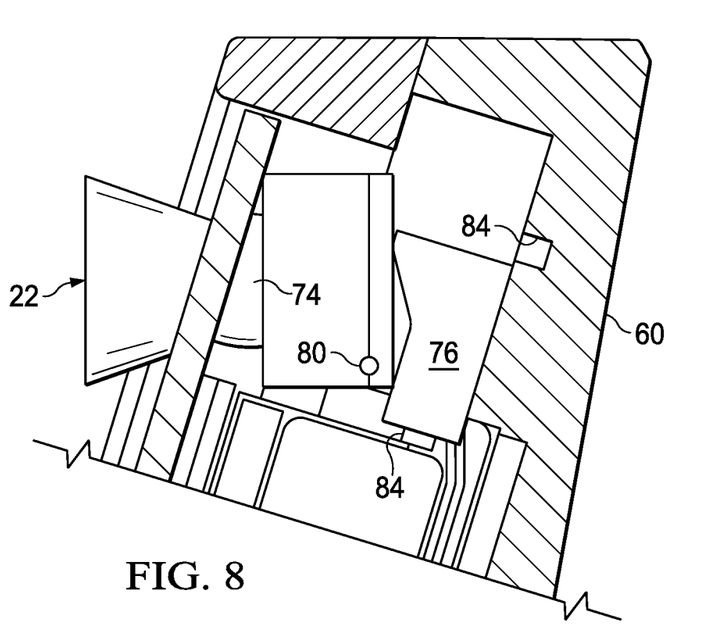
FIG. 8 depicts an example embodiment of an infrared time of flight sensor oriented off the perpendicular axis to correct to an expected end user positon relative to the housing portion.

FIG. 8 depicts an example embodiment of an infrared time of flight sensor 22 oriented off the perpendicular axis to correct to an expected end user positon relative to the housing portion. In the example embodiment, wire 78 has shortened in response to application of current to pull a raised portion of sliding substrate 76 behind shaft mount 80 causing shaft mount 80 to tip forward. Time of flight sensor 22 is tilted forward by substrate 76 to align with the off perpendicular axis, as illustrated by FIGS. 5A and 5B. Retainer 84 engages substrate 76 after wire 78 shortens to hold substrate 76 in position. In the example embodiment, retainer 84 includes a push-push type of engagement and a bias of substrate 76 back towards the perpendicular alignment so that a subsequent heating of wire 78 releases substrate 76 to slide upwards and align the flat surface under shaft structure 80. In alternative embodiments, alternative types of actuators may be used, such as a dual nickel titanium wire actuator that has one wire to actuate for each direction. In one alternative embodiment, wire 78 may interface with a hinge to mechanically move substrate 76 at defined hinge angles. Other types of actuator might include a solenoid, a microfluid reservoir or magnets, such as electropermanent magnets.

Although the present invention has been described in detail, it should be understood that various changes, substitutions and alterations can be made hereto without departing from the spirit and scope of the invention as defined by the appended claims.

What is claimed is:

1. An information handling system comprising:
a portable housing having first and second housing portions rotationally coupled by a hinge to rotate between closed and open positions;
a processor disposed in the portable housing and operable to execute instructions to process information;
a memory disposed in the portable housing and interfaced with the processor to store the instructions and information;
a display disposed in the housing and interfaced with the processor to present the information as visual images;
an infrared time of flight sensor interfaced with processor and operable to detect end user presence and absence in a scan field of view having plural scan regions, the processor adapting presentation of the display visual images based upon the detected user presence and absence; and
an actuator interfaced with the infrared time of flight sensor and operable to actuate the infrared time of flight sensor between first and second axes of alignment upon a rotational position of the first and second housing portions, the infrared time of flight sensor adjusting the scan field of view in response to the actuation at least in part by aligning the plural scan regions according to the first and second axes.

2. The information handling system of claim 1 further comprising:
an orientation sensor interfaced with the processor and the infrared time of flight sensor, the orientation sensor operable to detect an orientation of the time of flight sensor; and
an orientation module interfaced with the orientation sensor and operable to apply the orientation to determine a direction for the actuator to adjust the scan field of view.

3. The information handling system of claim 2 wherein the display includes one or more display portions disposed over both the first and second housing portions, the infrared time of flight sensor is disposed in the first housing portion, and the actuator adjusts the scan field of view to a first orientation when the first housing portion is vertical relative to the end user and to a second orientation when the second housing portion is vertical relative to the end user.

4. The information handling system of claim 1 wherein the actuator comprises a substrate that slides relative to the infrared time of flight sensor between first and second positions, the substrate having a first surface that aligns the infrared time of flight sensor along a first axis in the first position and a second surface that aligns the infrared time of flight sensor to a second axis in the second position.

5. The information handling system of claim 4 wherein the actuator further comprises a link to the hinge configured to slide the substrate to the first position at a first hinge rotational orientation range and to the second position at a second hinge rotational orientation range.

6. The information handling system of claim 5 further comprising non-transitory memory storing presence detection logic operable when executed on the processor to adapt presence detection in response to transitions between the first and second axes.

7. The information handling system of claim 6 wherein the presence detection logic adapts presence detection by performing a reset of the infrared time of flight sensor.

8. The information handling system of claim 6 wherein the presence detection logic adapts presence detection by correlating scan regions at the first axis with scan regions at the second axis.

9. The information handling system of claim 5 wherein the link further comprises:
a nickel titanium wire coupled to the substrate;
a current source interfaced with the nickel titanium wire;
a retainer interfaced with the substrate to retain the substrate at the second axis; and
non-transitory memory storing actuator logic operable when executed on the processor to apply current to shorten the nickel titanium wire thereby sliding the substrate to engage the retainer at the second axis.

10. A method for detecting human presence at an information handling system, the method comprising:
detecting a portable housing of the information handling system in a first configuration;
monitoring a first axis relative to the information handling system with an infrared time of flight sensor aligned along the first axis;
detecting a transition from the first configuration to a second configuration;
in response to the detecting, initiating an actuation to realign the infrared time of flight sensor with a second axis relative to the information handling system; and
in response to the initiating, adapting the infrared time of flight sensor to monitor the second axis with a command sent by a processor of the information handling system to the infrared time of flight sensor.

11. The method of claim 10 further comprising:
retaining the infrared time of flight sensor aligned with a retainer along one of either the first axis or the second axis; and
actuating between the first and second axes with an instantaneous movement.

12. The method of claim 11 further comprising:
coupling a nickel titanium wire to the infrared time of flight sensor; and
providing the instantaneous movement with a current applied to the nickel titanium wire.

13. The method of claim 11 wherein:
the portable housing has first and second portions, each portion having a display disposed at an upper surface;
the first configuration has the first portion resting on a support surface and the second portion raised vertically;
the second configuration has the second portion resting on the support surface and the first portion raised vertically;
the first axis proceeds out a side of the first housing portion; and
the second axis proceeds out a face of the first housing portion substantially perpendicular to the display.

14. The method of claim 10 wherein the adapting the infrared time of flight sensor to monitor the second axis with a command further comprises commanding a reset of the infrared time of flight sensor.

15. The method of claim 10 wherein the adapting the infrared time of flight sensor to monitor the second axis with a command further comprises aligning scan regions of the first axis with scan regions of the second axis that fall in a common relative position.

16. The method of claim 10 wherein:
the detecting a transition from the first configuration to the second configuration comprises detecting rotation of a first portion of the housing from a first rotational orientation of less than 90 degrees to a second rotational orientation of greater than 110 degrees; and the first axis is substantially perpendicular to a plane of the first housing portion and the second axis is at least partially off perpendicular directed towards the second housing portion.

17. A system for directing an infrared time of flight sensor, the system comprising:

a substrate disposed behind the infrared time of flight sensor, the substrate having a first surface to align the infrared time of flight sensor with a first axis and a second surface to alight the infrared time of flight sensor with a second axis;

a sensor operable to detect first and second configurations of the infrared time of flight sensor; and an actuator interfaced with the substrate and the sensor, the actuator operable to slide the substrate to align the first surface with the infrared time of flight sensor when the sensor detects the first configuration and to align the second surface with the infrared time of flight sensor when the sensor detects the second configuration.

18. The system of claim 17 wherein the actuator further comprises:

a nickel titanium wire coupled to the substrate;

a current source interfaced with the nickel titanium wire, the current when applied generating heat at the nickel titanium wire; and a retainer operable to engage the substrate to retain the substrate in the first position or the second position.

19. The system of claim 17 wherein the first configuration comprises first and second housing portions rotated to a clamshell position, the first configuration having less than a predetermined rotational orientation, the second configuration having greater than the predetermined rotational configuration.

20. The system of claim 17 wherein the first configuration comprises first and second housing portions rotated to a clamshell position, the first configuration having less than the first housing portion raised vertical over the second housing portion, the second configuration having the second housing portion raised vertical over the first housing portion.

* * * * *